2 Sheets—Sheet 1.

W. ASHBY,

Assignor to W. B. CARITHERS.

Steam-Engine Governor.

No. 8,735. Reissued June 3, 1879.

Witnesses:

C. Clarence Poole

R. A. Dyer

Inventor:

Warner B. Carithers by Geo. W. Dyer & Co

Atty

N. PETERS, PHOTO-LITHOGRAPHER, WASHINGTON, D. C.

W. ASHBY,

Assignor to W. B. CARITHERS.

Steam-Engine Governor.

No. 8,735. Reissued June 3, 1879.

Witnesses:

C. Clarence Poole

R. T. Dyer.

Inventor:

Warren B. Carithers by Geo. W. Dyer & Co

Attys.

N. PETERS, PHOTO-LITHOGRAPHER, WASHINGTON, D. C.

UNITED STATES PATENT OFFICE.

WARNER B. CARITHERS, OF TOULON, ILL., ASSIGNEE OF WILLIAM ASHBY.

IMPROVEMENT IN STEAM-ENGINE GOVERNORS.

Specification forming part of Letters Patent No. 85,632, dated January 5, 1869; Reissue No. 8,735, dated June 3, 1879; application filed September 19, 1878.

*To all whom it may concern:*

Be it known that WILLIAM ASHBY, of Timber township, Peoria county, in the State of Illinois, invented an Improved Governor and Indicator for Steam-Engines; and it is hereby declared that the following is a full and exact description thereof, reference being had to the accompanying drawings, forming part of this specification.

The object of the invention of said ASHBY was such an improvement in governors as to provide in a simple, effective, and durable manner for the regular automatic supply of power to machinery, with the view of uniform motion of the same.

The invention of said ASHBY consists in devices for preventing the further revolution of the intermediate friction-wheel and its horizontal shaft, and the consequent further opening of the power-supply valve or gate, when such valve or gate is fully opened; also, in a provision for the adjustment of the intermediate friction-wheel while the engine is in operation, so as to change the rate of speed, when desired; and, further, in peculiar devices for indicating the rise and fall of the power-supply or the corresponding closing and opening of the valve or gate, and also to sound an alarm when the valve or gate reaches either limit of its movement, all as fully hereinafter explained.

In order that those skilled in the art may know how to make and use this governor, the same is now described in connection with the accompanying drawings, in which—

Figure 1:
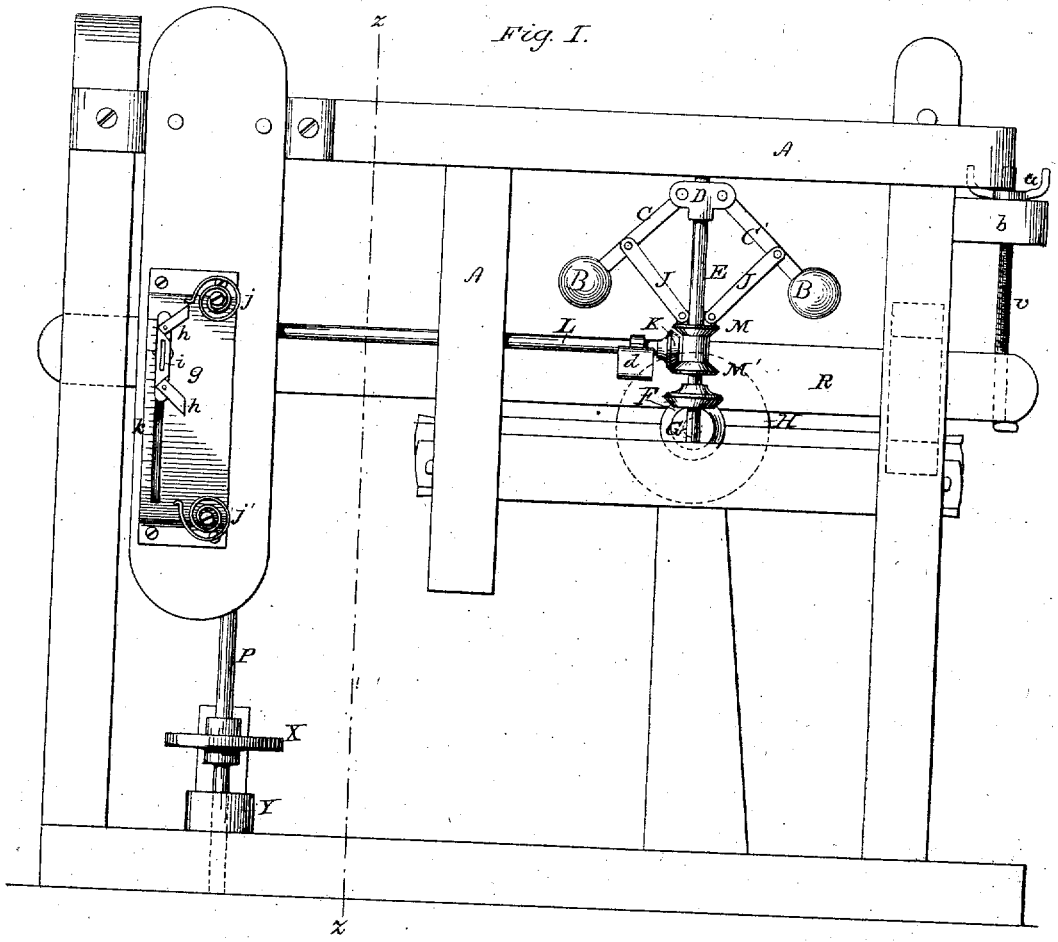
Figure 3:
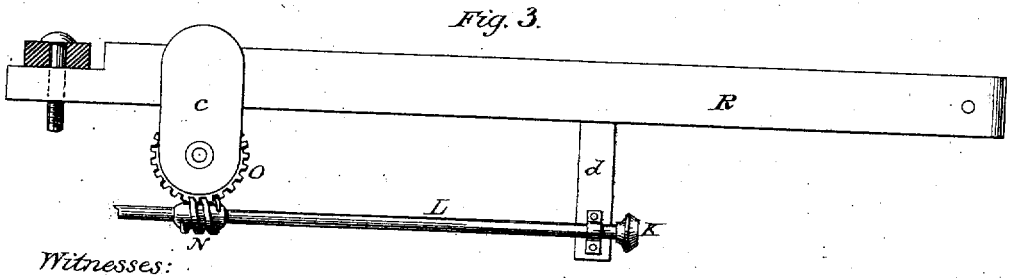
Figure 2:
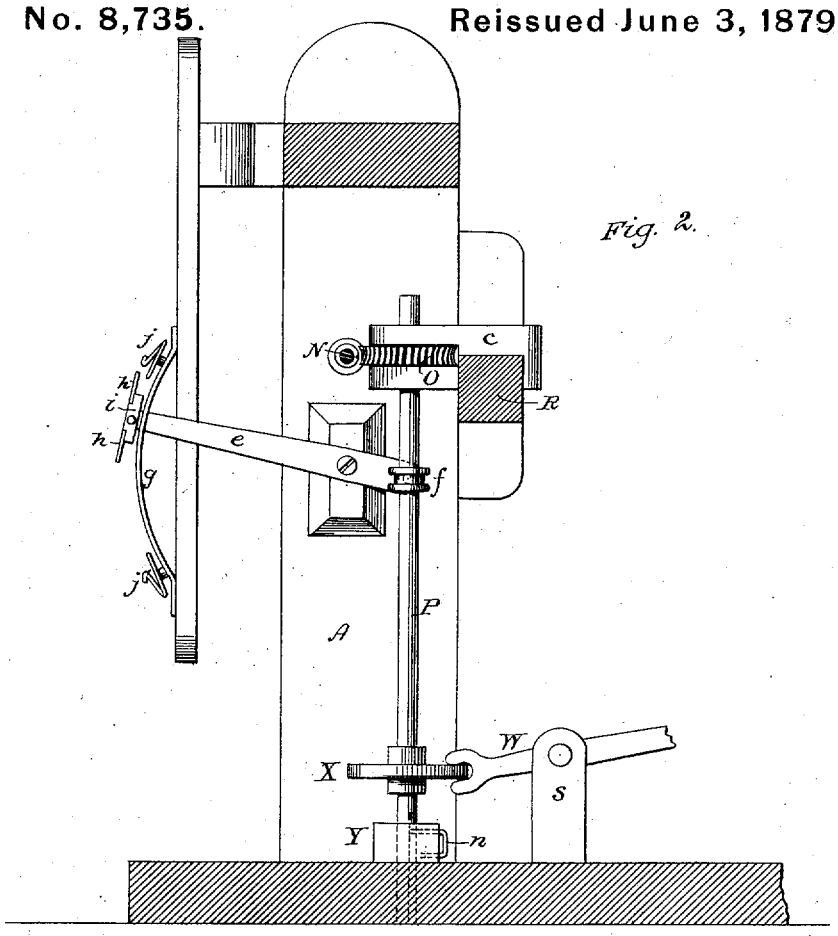
Figure 4:
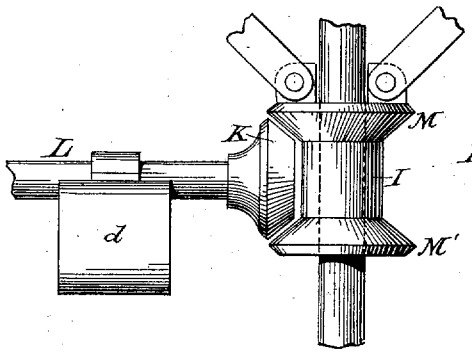

Figure 1 is a side elevation; Fig. 2, a transverse sectional elevation at the line *z z* on Fig. 1. Fig. 3 is a top view of the adjusting beam or lever, with parts attached to the same; and Fig. 4 is a detached view, on a larger scale, of the sliding collar and sleeve, and the flanges or wheels, and intermediate wheel.

The frame A supports and holds the different parts of the mechanism employed in the governor. B B are centrifugal balls suspended on the arms C C, pivoted in the head D, fixed on the shaft E, this shaft receiving motion from the engines through the bevel-gear at F and the shaft G, which may be turned by a belt on the pulley H, or otherwise. The sliding collar or sleeve I on the shaft E is connected to the arms C C′ by the rods or straps J J, pivoted at both ends, and is provided with two beveled friction wheels or flanges, M M′, either of which may come in contact with the beveled wheel K, placed between them on the shaft L, but set so far apart that when one is in contact with K the other will be clear of it. The shaft L will therefore be turned in one direction, or the opposite, according as the rising or falling of the collar I may bring its lower or upper flange, M or M′, in contact with the wheel K.

The shaft L has on it a spiral thread or worm, N, working in the teeth of the wheel O, arranged as a nut on the screw rod or shaft P, so as to raise or depress the rod P, according to the direction in which the shaft L is turned.

The lower end of the rod P may be connected to the supply-valve by any of the usual and well-known modes of connection, or by means of the lever W, pivoted upon the stand S.

When the engine is running steadily and satisfactorily the flanges or faces M M′ will not come in contact with the wheel K, as shown in Fig. 4; but if the motion of the engine communicated to the shaft E and balls B shall become rapid enough to cause the balls to swing out by the centrifugal force generated, the sliding collar I will be raised and its lower flange, M′, brought in contact with the wheel K, so as to turn the shaft L, and thus give motion to the rod P; but if, on the other hand, the speed slackens, so that the balls B tend to fall or collapse, the collar I will be depressed, and its upper flange, M, brought in contact with the wheel K, and the shaft L will be turned in the opposite direction to that given in the former case, and a corresponding movement given to the rod P, and thus the supply-valve may be opened wider or shut closer, as required, to give, as nearly as may be, a uniform motion to the engine and machinery.

The lever or beam R is pivoted at one end upon the frame A, while its opposite end is arranged to traverse vertically in a bracket on a post of the frame A, being raised or lowered, as required, by means of the nut *a* on the screw-rod *v*, said nut and rod being held by the stand *b*, projecting from the frame A.

The stand *c* on the lever R holds the nut-wheel O, and the arm *d* on the same supports the bearing of the shaft L, and by means of the nut *a*, therefore, which raises or lowers the end of the lever R, the shaft L and wheel K may be adjusted so as to place the wheel K at such a point of elevation as will secure the required rate of speed, whether high or low; for it is evident that if the wheel K be raised the balls B must receive a more rapid motion before the collar I will be raised far enough for its lower flange to act upon the wheel K, so as to give motion to the rod P, and thus check the power-supply, and that if the wheel K be depressed a lower rate of speed will produce the same effect. In this way, then, the governor may be adjusted to secure uniformity in the rate of speed, whether a high or low rate be required, and the rate of speed may at any time be changed by raising or lowering the lever R, without its being necessary to stop the engine or machinery.

The lever *e* is pivoted upon a block fastened to the frame A, and has a pin projecting into the groove in the collar *f* on the rod P, so that the rising and falling of the rod P, and consequently the opposite end of the lever *e*, projecting through a slot in the plate *g*, will show when the power-supply valve or gate is closing and opening, while the lever traverses from one end of the slot to the other or back again until the valve is fully opened or closed, as the case may be.

It will be seen that when the lever *e* reaches either end of its slot its movement in that direction will be stopped, and it will prevent any further movement of the intermediate friction-wheel and its horizontal shaft, and consequently, through its connections, of the power-supply valve or gate.

The strikers *h h* on the block *i*, fastened on the lever *e*, by coming in contact with the bell *j* or *j'*, as the case may be, will give notice in the one case when the speed is about to diminish, and in the other case to give notice when the steam is about to escape through the safety-valve.

The plate *g* may have a scale, *k*, on which figures may be placed indicating any given position of the finger.

The thumb-latch *n*, situated on the block Y, through which the rod P passes down to the steam-valve, may be sprung out of the groove in the rod P, so as to allow the rod P to be turned by the hand-wheel X in starting or stopping the engine.

Although this device is described as adapted to steam-governors, it is evident that it may without change of its principal operative parts be applied to governors for engines driven by other power than steam.

Having thus described the invention of said ASHBY, what I claim as new therein, is—

1. The combination of the centrifugal governor arms and balls, the sliding collar or spool, having beveled friction-flanges, revolving with the governor-arms, an intermediate beveled friction-wheel connected with the power-supply valve or gate, and devices for stopping the movement of said beveled friction-wheel, and the further movement of the power-supply valve or gate when such valve is fully opened, substantially as described.

2. In a centrifugal governor, the combination of the arms and balls, the sliding collar or spool, having beveled friction-flanges, and revolving with said arms and balls, an intermediate beveled friction-wheel, its shaft having spiral thread or worm, a cog-wheel meshing with such worm and operating a shaft adapted to move the power-supply valve or gate, and a lever, *e*, operated by said last-named shaft, and adapted to stop the movement of the intermediate beveled friction-wheel and the parts connected therewith, and the further opening of the power-supply valve or gate when such valve or gate is fully opened, substantially as described.

3. The combination, with the centrifugal governor-arms, a sliding collar or spool, having beveled friction-flanges, connected to and revolving with the governor-arms, and a beveled friction-wheel intermediate between the flanges of the collar or spool, and mounted on a shaft which is adjustable, substantially as and for the purpose set forth.

4. The combination of the lever R, screw-rod *v*, arm *d*, shaft L, and stand *e*, substantially as set forth.

5. The combination of the grooved collar *f* on the rod P, lever *e*, index-scale *g*, strikers *h* and *h'*, and bells *j* and *j'*, substantially as described.

WARNER B. CARITHERS.

In presence of—
HOPKINS SHIVVER,
MILES A. FULLER.